(12) United States Patent
Jawidzik

(10) Patent No.: US 6,247,674 B1
(45) Date of Patent: Jun. 19, 2001

(54) FOLDING BEDRAIL MOUNT FOR A PATIENT MONITOR

(75) Inventor: Geoffrey C. Jawidzik, Montclair, NJ (US)

(73) Assignee: Datascope Investment Corp., Montvale, NJ (US)

(*) Notice: Subject to any disclaimer, the term of this patent is extended or adjusted under 35 U.S.C. 154(b) by 0 days.

(21) Appl. No.: 09/387,409

(22) Filed: Sep. 2, 1999

(51) Int. Cl.$^7$ .................................................. A47B 96/06

(52) U.S. Cl. ................................. 248/213.2; 248/291.1; 5/503.1; 5/658

(58) Field of Search .............................. 248/231.2, 917, 248/918, 919, 920, 921, 922, 923, 317, 324, 291.1; 361/679, 680, 681, 682, 683; 5/503.1, 658

(56) References Cited

U.S. PATENT DOCUMENTS

| | | | |
|---|---|---|---|
| 2,789,624 | * 4/1957 | Aucoin | 5/658 X |
| 4,561,549 | * 12/1985 | Yokohori | 5/658 X |
| 4,946,300 | * 8/1990 | Makita | 361/681 X |
| 5,275,170 | 1/1994 | Lewis | 128/696 |
| 5,396,399 | * 3/1995 | Blair et al. | 361/681 |
| 6,016,248 | * 1/2000 | Anzai et al. | 361/681 X |

\* cited by examiner

Primary Examiner—Jerry Redman
(74) Attorney, Agent, or Firm—Abraham Ronai

(57) ABSTRACT

A foldable monitor bedrail mount comprising a pair of U-shaped brackets pivotally connected on one end to a surface of the monitor and pivotally connected on the opposite end to a connecting rod. The U-shaped brackets pivot relative to the monitor and connecting rod between an open position, in which the monitor may be mounted on a bed rail, and a folded position, in which the mount assembly lies compactly against the rear surface of the monitor.

9 Claims, 6 Drawing Sheets

US 6,247,674 B1

FOLDING BEDRAIL MOUNT FOR A PATIENT MONITOR

BACKGROUND OF THE INVENTION

1. Field of the Invention

The present invention relates generally to a folding bedrail mount for a patient monitor. More specifically, the invention relates to a patient monitor bedrail mount capable of folding flat against a rear surface of a monitor when not in use.

2. Description of the Prior Art

Portable monitors have been developed to move with the patient within a hospital setting. Portable monitors, such as the Passport™ monitor, manufactured by Datascope Corp. (Montvale, N.J.), are used in emergency departments, operating rooms and other departments of a hospital that may transport a patient from the patient's room to another area such as X-Ray or imaging. The portable monitor is needed in these transport situations whenever a patient is considered less than stable or above normal risk.

High risk or unstable patients are generally transported on a hospital bed or gurney. A typical hospital bed has a generally rectangular tubular metal frame construction with supports for a mattress and with a wheeled undercarriage. The mattress frame is typically supported on the wheeled undercarriage by an arrangement of collapsible legs so that the bed can be collapsed together for carriage in an ambulance. The bed may be supplied with various additional members, for example side rails. A typical hospital bed is disclosed in U.S. Pat. No. 3,644,940, issued on Feb. 29, 1972 to Bourgraf et al., herein incorporated by reference.

Transporting a patient generally requires a bed switch. Bed switching requires the transfer to the destination bed of any medical monitoring equipment connected to the first bed. During transportation, medical monitors are typically either mounted on a rolling stand or are hooked onto a side rail via a bracket projecting from a rear surface of the monitor. For those monitors with a bracket, see U.S. Pat. No. 5,275,170, issued to Lewis on Jan. 4, 1994, the monitor must be lifted off the existing bed and connected to the transfer bed. The monitor is also removed from a patient's bed when there is a need to use the monitor for another patient.

Most hospitals are very hectic and chaotic, especially in emergency situations. The existence of the protruding bracket from the rear surface of the portable monitor creates the danger that the bracket will become entangled with other neighboring equipment or that it may hit something or someone while the monitor is being moved.

SUMMARY OF THE INVENTION

Accordingly, it is an object of the invention to produce a patient monitor bedrail mount capable of folding flat against a rear surface of a monitor when not in use.

The invention is a foldable monitor bedrail mount comprising a pair of U-shaped brackets pivotally connected on one end to a surface of the monitor and pivotally connected on the opposite end to a connecting rod. Said U-shaped brackets pivot relative to the monitor and connecting rod between an open position, in which the monitor may be mounted on a bed rail, and a folded position, in which the mount assembly lies compactly against the rear surface of the monitor.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
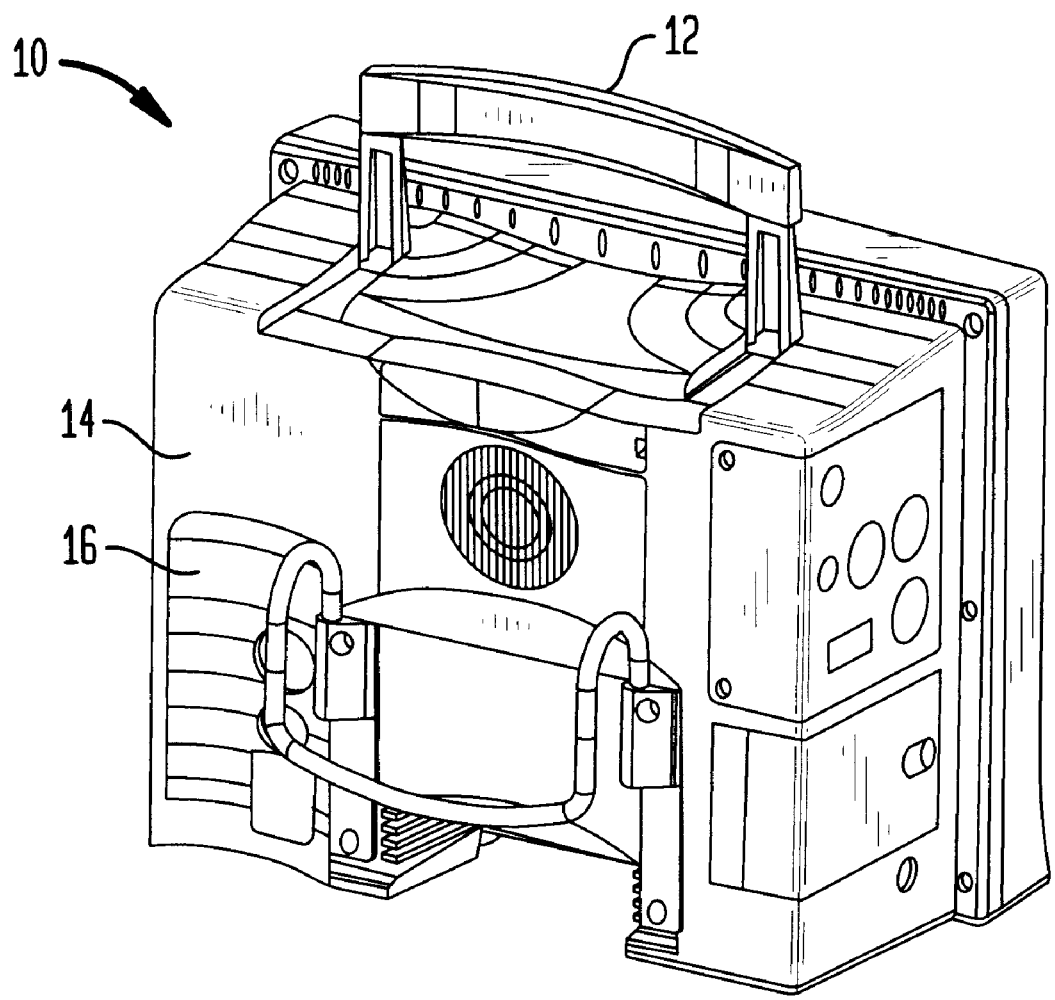
FIG. 1 is a rear perspective view of a patient monitor having the folding bedrail mount of the present invention in an open/unfolded position.

FIG. 1 illustrates a rear perspective view of a patient monitor 10 having a handle 12, a rear surface 14, and a bedrail mount assembly 16 attached to said rear surface 14.

Figure 2:
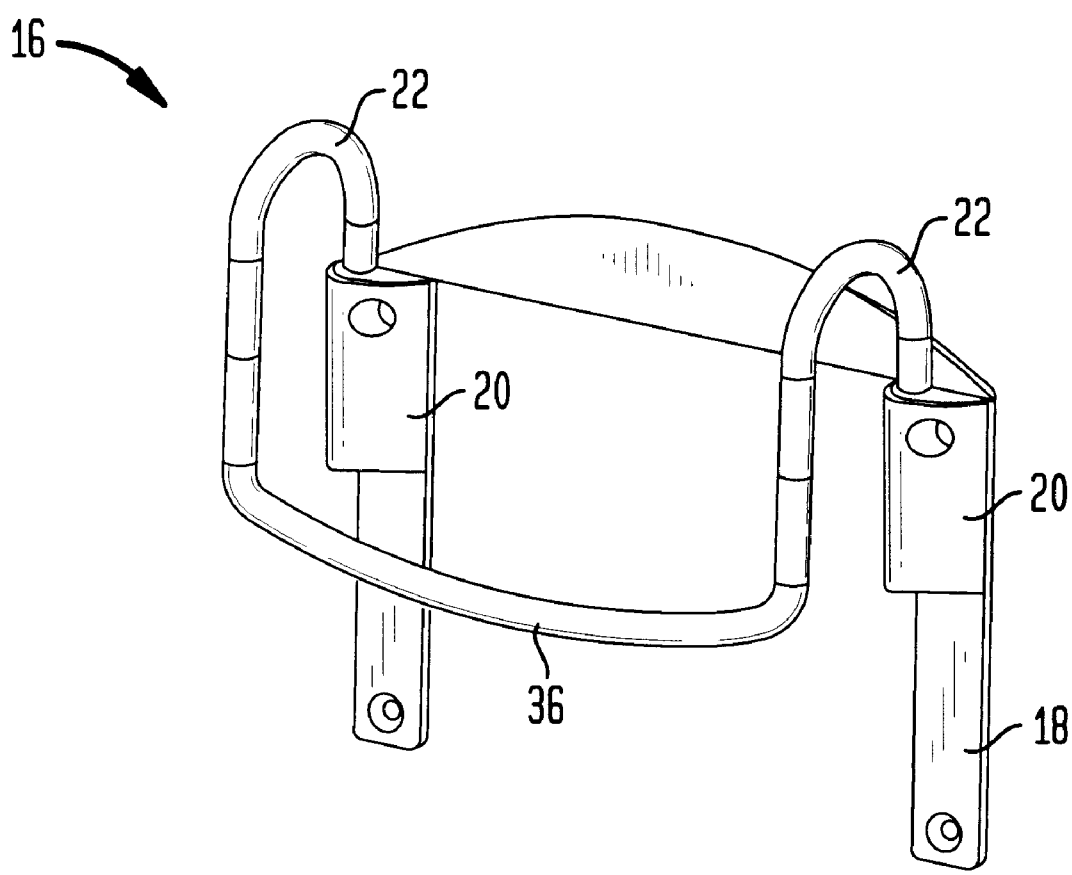
FIG. 2 is a perspective view of the bedrail mount assembly shown independent of the monitor.

FIG. 2 illustrates the bedrail mount assembly 16 independent of the monitor 10. The bedrail mount assembly 16 comprises an interface plate 18, a pair of support blocks 20 connected to said interface plate 18, a pair of U-shaped brackets 22 each pivotally connected on a first end 19 (see FIG. 3) to one support block 20, and a bracket-to-bracket U-shaped connecting rod 36 connecting a second end 24 (see FIG. 3) of the two U-shaped brackets 22. Note that use of alternate shape brackets 22 for attachment to bed post of various configurations is anticipated and the term U-shape refers to V-shapes, rectangular shapes, and other similar shapes as well. Note further that although the bedrail mount assembly 16 is shown in FIGS. 1 and 4 connected to the rear surface 14 of the monitor 10 connection of said bedrail mount assembly 16 to other surfaces of the monitor 10 is anticipated.

Figure 3:
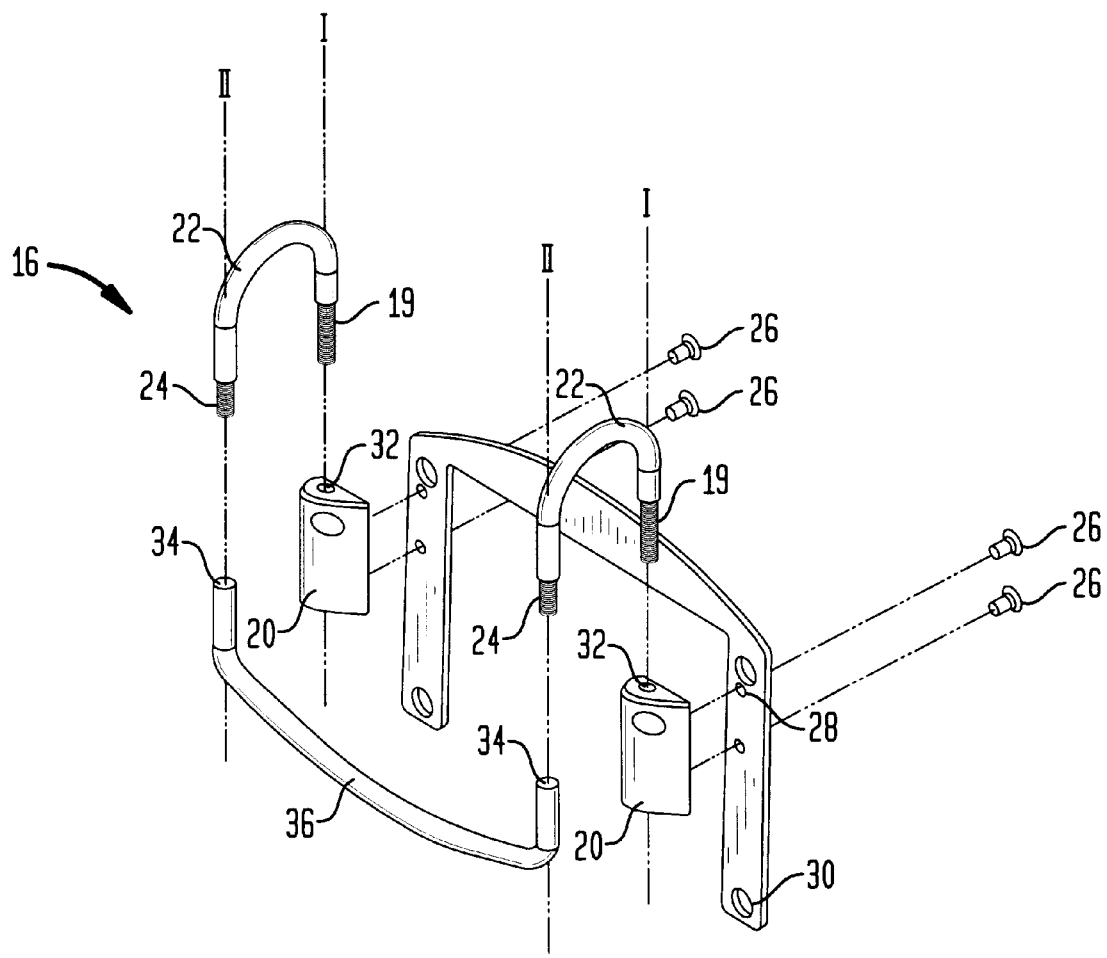
FIG. 3 is an exploded assembly view of the folding bedrail mount assembly.

FIG. 3 is an exploded assembly view of the folding bedrail mount assembly 16. Screws 26 connect support blocks 20 to the interface plate 18 through holes 28 in said interface plate 18. Screw holes 30 are used for connecting the interface plate 18 to the rear surface 14 of the monitor 10 (screws are not shown). The first end 19 of each U-shaped bracket 22 is threaded and is screwed into a hole 32 having a mating threaded surface (not shown) in each support block 20. The second end 24 of each U-shaped bracket 22 is threaded and screwed into a hole 34, having a mating threaded surface (not shown), on each end of the connecting rod 36. Upon movement of the connecting rod 36 from side to side the U-shaped brackets 22 pivot about line I relative to the support block 20 and pivot about line II relative to the connecting rod 36. It should be noted that although the support blocks 20 are shown connected to the interface plate 18 by means of screws any connecting means known in the art may be used, such as but not limited to welding. The support block 20 and the interface plate 18 may even be manufactured so as to be one part. Alternatively, the rear surface 14 of the monitor 10 may be adapted such that the first end 19 of the U-shaped bracket 22 may connect directly to the rear surface 14. Similarly, although the interface plate 18 is shown screwed to the monitor 10, other means of attachment known to those skilled in the art are contemplated.

Figure 4:
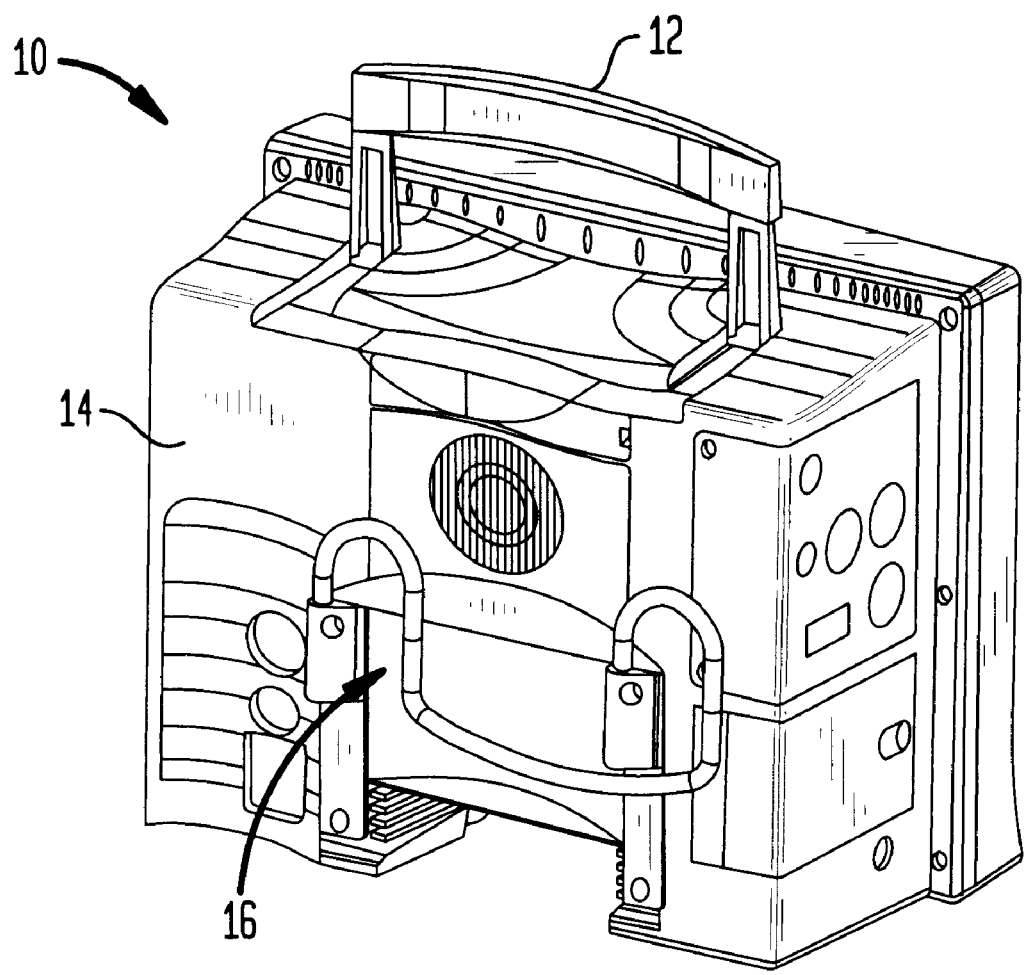
FIG. 4 is a rear perspective view of a patient monitor having the folding bedrail mount in closed/folded position.

Upon removal of the monitor 10 from a hospital bed the bedrail mount assembly 16 may be folded compactly against the rear surface 14 of the monitor 10, as illustrated in FIG. 4. Note that the bedrail mount assembly 16 may be folded either to the right, as illustrated in FIG. 4, or to the left. The bedrail mount assembly 16 is assembled in the following manner. First, the second end 24 of each U-shaped bracket 22 is screwed in one hole 34 on the end of the connecting rod 36. The U-shaped bracket 22 is not screwed tightly. Rather, there is enough thread length between the connecting rod 36 and the U-shaped bracket 22 to allow for an effortless ±90 degree rotation of the U-shaped bracket 22 relative to the connecting rod 36. Next, the first end 19 of each U-shaped bracket 22 is screwed in the hole 32 in one support block 20. As above, the U-shaped bracket 22 is not screwed on tightly. Rather, there is enough thread length between the U-shaped bracket 22 and the support block 20 to allow for an effortless +90 degree rotation of the U-shaped bracket 22 relative to the support block 20.

Note that it is contemplated that the first end of the U-shaped bracket 22 may be pivotally connected to the support block 20 in a number of ways. The first end 19 may rest in a ball bearing in the support block 20, or alternatively, the first end 19 may simply fit through a hole in the support block 20 and have a clip or nut on the far end preventing the U-shaped bracket 22 from being pulled out. Methods known in the art of pivotally connecting two members together are herein incorporated by reference. Furthermore, the rear surface 14 of the monitor 10 may be adapted so as to allow the first end 19 of the U-shaped bracket 22 to pivotally connect directly to said rear surface 14. Similarly, the connecting rod 36 may be pivotally connected to the second end 24 of the U-shaped bracket 22 by other means and methods known in the art.

In an alternate embodiment of the invention the bedrail mount assembly 16 may comprise one or more independent brackets pivotally connected on one end to a monitor surface. If one bracket is used it may be desirable for the bracket to be wider for monitor support stability.

Figure 5:
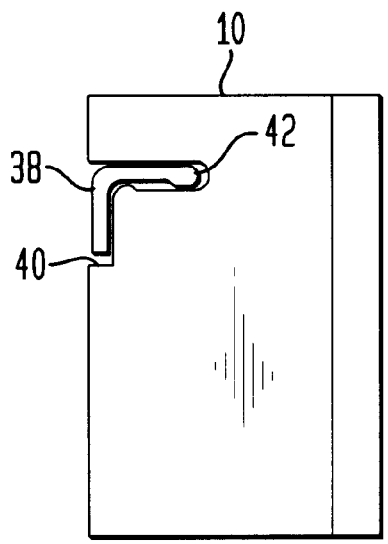
FIG. 5 is a side view of a monitor having a bracket insertable into a recess in a rear surface of the monitor.
Figure 6:
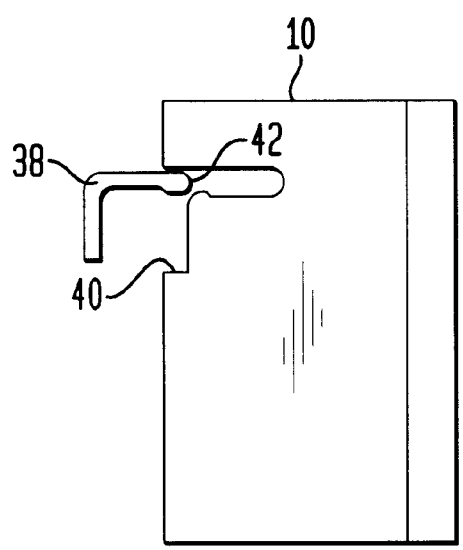
FIG. 6 is a side view of the monitor of FIG. 5 with the bracket in an open position.
Figure 7:
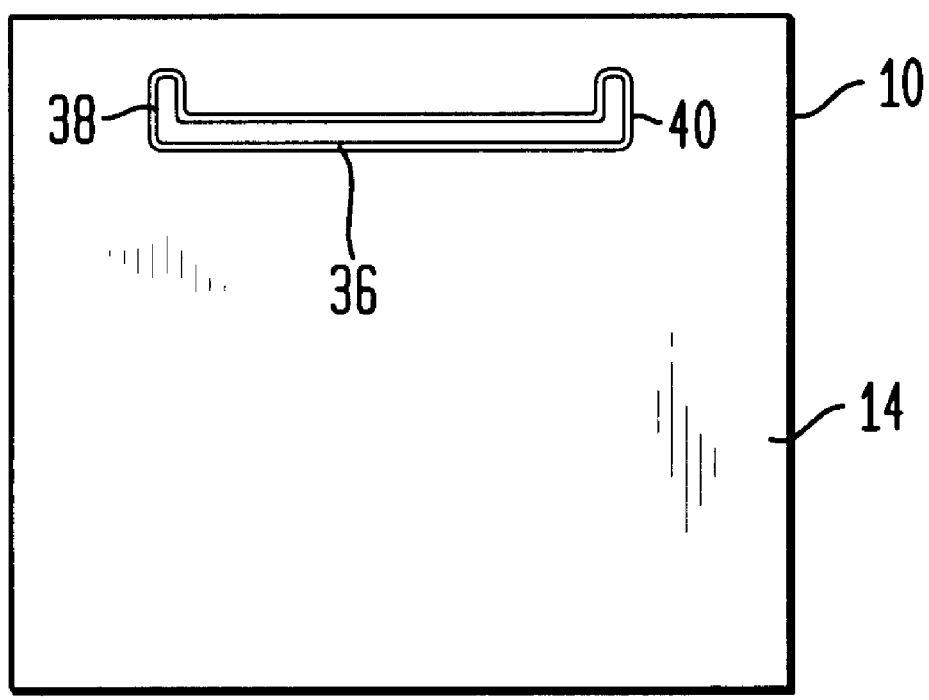
FIG. 7 is a rear view of monitor of FIG. 5.

FIGS. 5 and 6 illustrates a side view of another embodiment of the invention. In this embodiment L-shaped brackets 38, rather than folding against the monitor 10, are insertable into a recess 40 in the monitor 10, FIG. 5 illustrates the L-shaped brackets 38 in a closed position and FIG. 6 illustrates the L-shaped brackets 38 in an open position. The use of other shaped brackets that can be pulled out of recesses in the monitor 10 are contemplated. Note that proximal end 42 of each L-shaped bracket 38 prevents the L-shaped brackets 38 from being completely pulled out of the recess 40. FIG. 7 illustrates a rear surface 14 of the monitor 10. The L-shaped brackets 38 are connected by a connecting rod 36.

Although the invention herein has been described with reference to particular embodiments, it is to be understood that these embodiments are merely illustrative of the principles and applications of the present invention. It is therefore to be understood that numerous modifications may be made to the illustrative embodiments. Accordingly, although the foldable mount assembly has been described for use with a monitor it should be noted that use of said assembly is anticipated for the hanging or mounting of any type of device, including but not limited to patient monitors.

What is claimed is:

1. A monitor having a display surface, an opposing rear surface, and a mounting assembly connected to said rear surface, said mounting assembly comprising a pair of independent bracket elements, having first and second ends, and a connecting element connecting the second ends of the bracket elements, the bracket elements are pivotally connected on their second ends to opposite ends of the connecting element and are pivotally connected on their first ends to the rear surface of the monitor.

2. The monitor as claimed in claim 1 wherein the bracket elements have substantially a U-shape.

3. The monitor as claimed in claim 1 wherein the connecting element has substantially a C-shape.

4. The monitor as claimed in claim 1 wherein the first ends of the bracket elements are pivotally connected to a housing, said housing being connected to the surface of the rear monitor.

5. The monitor as claimed in claim 4 wherein the housing is connected to an interface plate which is connected to the rear surface of the monitor.

6. A mounting assembly comprising a pair of substantially U-shaped brackets, having first and second threaded ends, a substantially C-shaped connecting element having a threaded hole in each end, and a pair of support members for connection to a device, each support member having a threaded hole, the first end of each U-shaped bracket is screwed into the hole in one support member, the second end of each U-shaped bracket is screwed into the hole on one end of the connecting element.

7. The mounting assembly as claimed in claim 6 wherein the brackets pivot relative to the support members and the connecting element.

8. The mounting assembly as claimed in claim 7 wherein the support members are connected to a surface of a monitor.

9. A monitor mounting assembly comprising two or more brackets connected to a monitor, said brackets having substantially a L-shape and being connected by a connecting rod, said monitor having a recess in a surface comprising a L-shaped portion and a connecting rod shaped portion, said bracket being slidable in said recess such that the brackets fit into the L-shaped portion and the connecting rod fits in the connecting rod shaped portion.

\* \* \* \* \*